April 24, 1951   A. D. COGGESHALL   2,550,453
METHOD OF PRODUCING INSULATED COILS
Filed Dec. 13, 1948
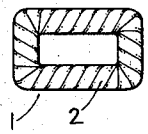
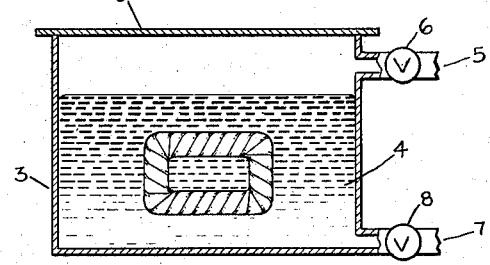
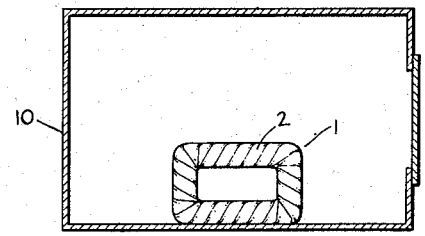
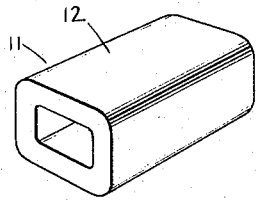
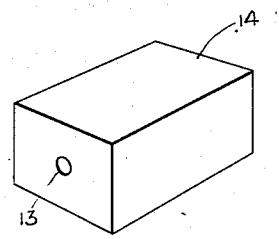
Inventor:
Almy D. Coggeshall,
by Abraham Cohen
His Attorney.

Patented Apr. 24, 1951

2,550,453

UNITED STATES PATENT OFFICE 2,550,453

METHOD OF PRODUCING INSULATED COILS

Almy Darleny Coggeshall, Schenectady, N. Y., assignor to General Electric Company, a corporation of New York Application December 13, 1948, Serial No. 65,003

1 Claim. (Cl. 154—80)

This invention relates to a method of insulating electrical devices. More particularly it relates to an improved method of impregnating electrical devices with a resinifiable fluid.

In insulating electrical devices various methods have been employed in impregnating the elements with dielectric material. Heretofore it has been common practice to force into the interstices of the device, liquids which will solidify under heat or cooling, or solutions of resinous materials which will leave a solid insulating residue upon evaporation of the solvent. Both of these processes have inherent disadvantages. In the latter case in which a resin solution is used, the evaporation of the solvent leaves voids in the coil which are subject to short circuiting or arcing. In the case of impregnation with thermoplastic materials there is the possibility that the insulation will become fluid under high temperature operation or conversely that the material will become excessively brittle under non-operating low temperature conditions. When impregnating with a thermosetting resinous material which contains no solvent one of the difficulties encountered is the tendency of the insulating material to flow from the interstices of the coil before it is cured or set, the resulting voids thus defeating the main purpose of using this type of impregnant.

It is an object of this invention to provide a means of impregnating electrical devices with thermosetting solventless liquids.

It is a further object of this invention to provide a simple method of impregnating electrical devices with thermosetting resinous material whereby leakage of the uncured resin from the device is inhibited.

Other objects will become apparent from a consideration of the following description taken in connection with the drawing in which Fig. 1 shows a wrapped electrical device ready for impregnation; Fig. 2 is a sectional elevation view of an impregnating tank with the device in position; Fig. 3 is a sectional elevation view of a curing oven with the impregnated device in place and Figs. 4 and 5 show electrical devices after curing.

In accordance with my invention it has been found that electrical devices may be very simply and completely insulated with thermosetting solventless resins by wrapping the devices in a material which will permit ingress of a thermosetting liquid but which will prevent leakage of the unpolymerized material from the device.

More particularly it has been found that electrical devices may be easily and completely insulated with thermosetting material containing no solvent by wrapping the devices in a material which will permit the entrance of the thermosetting material through the material itself but which will prevent leakage from the device when pressure is removed.

This invention is based upon the discovery that by coating woven structures with certain other material a composite material can be provided which will permit the passage of so-called solventless thermosetting liquids through the composite material in one direction under pressure whereas, when pressure is removed the passage of the liquids in the opposite direction is prevented.

The invention is further based upon the fact that the coating material for the woven structure when subjected to pressure of a certain degree will deform between the web of the woven structure and open to permit the passage of fluid but, upon reduction of the pressure, will reassume its previous continuous and unperforated surface. The woven structure in effect serves as a support or base for the yielding coating permitting the distortion of the coating only between the fibers constituting the base, thus allowing the liquid to flow freely through the composite structure under pressure but at the same time preventing such mass displacement of the coating as will make it impossible or difficult for it to reassume its usual continuous and impervious surface.

Any woven fabric which is not disintegrated by the impregnating solution is suitable for the woven base material of the wrapping. Such materials include the various synthetic fabrics such as those made of nylon, cellulose acetate and viscose among others as well as those made of wool, silk, cotton, glass, asbestos and other fibrous materials.

The coating material must be insoluble in the impregnating solution and possess enough tackiness to cling to the woven base and to the surface of the electrical device and also have the ability or elasticity to deform under pressure but yet readily reassume a continuous surface when the pressure is released. Materials which have been found suitable for use in coating woven base materials used in this invention are: high viscosity polyisobutylene, uncured deposits of natural, Buna-S or Buna-N rubber which are usually compounded with tackifiers such as dibutyl phthalate, high viscosity alkyd resins, highly plasticized high polymers, such as polyvinyl chloride, polyvinyl acetates and their co-polymers, polyvinyl formal, polyvinyl butyral, cellulose esters and ethers such as cellulose acetate and ethyl cellulose. Combinations of the above will occur to those skilled in the art; for example, alkyd resins may be used as plasticizers and rubber-like materials and may be blended with vinyl resins to produce soft elastic bodies suitable for the purposes of this invention.

The thickness of the coating may be varied depending on the mesh size of the woven base and the elasticity of the coating. The more elastic the coating or its ability to reclose, the larger the mesh in the woven material may be. In general it has been found advisable to use regular grades of woven material which have thread counts varying from 50 to 100. Employing fabrics having such dimensions a layer 0.001 inch to 0.005 inch thick of any of the coating materials set forth above is very suitable. It will be understood that the above is given only by way of illustration and not by way of limitation, base materials having finer or coarser weaves being made useable by varying the thickness of the coating or by changing the pressure applied during passage of the impregnating fluid through the weave.

Impregnating fluids to be used in conjunction with this invention may include well known thermosetting solventless materials or varnishes. Such varnishes advantageously may comprise (1) a polymerizable unsaturated akyd resin, more particularly one obtained by partial reaction of ingredients including a polyhydric alcohol and an alpha-unsaturated alpha, beta-polycarboxylic acid, e. g., ethylene glycol fumarate, ethylene glycol maleate, diethylene glycol itaconate, triethylene glycol maleate, propylene glycol itaconate, glyceryl itaconate, ethylene glycol maleate phthalate, diethylene glycol fumarate sebacate, etc., and (2) a liquid monomer containing an ethylenic linkage that is copolymerizable with such alkyd resin, e. g., styrene, polyallyl (diallyl, triallyl, tetraallyl, etc.) esters of polybasic acids (e. g., inorganic polybasic acids, polycarboxylic acids, etc.), for instance, diallyl oxalate, diallyl malonate, diallyl sebacate, diallyl maleate, diallyl phthalate, diallyl itaconate, triallyl aconitate, triallyl tricarboxylate, triallyl phosphate, etc. The solventless varnish should also preferably contain a small amount, for instance, about 0.2 to 5 per cent by weight (of the polymerizable components), of a suitable catalyst, e. g., lauroyl peroxide, stearyl peroxide, ascaridole, benzoyl peroxide, acetyl peroxide, etc., for accelerating the conversion of the polymerizable component or components thereof to a thermoset or substantially insoluble and infusible state.

In addition to the polymerizable, thermosetting, solventless varnishes hereinbefore mentioned by way of illustration as being suitable for use in carrying the present invention into effect, other varnishes of this class may be employed, examples of which are given in copending application Serial No. 509,366 of Nordlander et al., filed November 8, 1943, now abandoned, and in the applications referred to therein, in Agens et al. Patent 2,404,204 and in D'Alelio Patents 2,260,005; 2,288,315; 2,308,494; 2,308,495; 2,319,798; 2,319,799; 2,323,706; 2,407,479; 2,428,787 and 2,428,788. Additional examples of catalysts that may be used to accelerate the polymerization of the polymerizable solventless varnish also are given in these applications and patents.

In carrying the invention into practice, an electrical device such as the coil represented by 1 in the drawing is wrapped as shown with the coated material in the form of tape 2, the coating material being preferably on the inside toward the device itself. No openings or interstices through or between the layers of tape need be or should be left since the impregnating liquid passes through the tape itself. The taped device is next placed in a pressure tank 3 and submerged in a bath of impregnating fluid 4 as shown in Fig. 2. Tank 3 is fitted with an inlet 5 and valve 6 through which gas pressure may be applied from any convenient source not shown. An outlet passage 7 and valve 8 are also provided for emptying the tank of fluid. With the cover 9 of the tank fixed securely in place by any convenient means, valve 6 is opened and gas such as air, nitrogen, carbon dioxide or other gas which will not react with the impregnant or device is introduced under pressure into the tank to force the fluid 4 through the tape 2 into the interstices within the electrical device. After a sufficient time has been allowed for impregnation, the pressure is released and the device is removed from the tank. Upon release of pressure the coating material on tape 2, which has stretched under pressure to admit passage of the fluid 4 into the electrical device, assumes its normal impervious condition and prevents leakage of fluid from within the device. The only drainage which need take place is that of fluid or liquid from the exterior of the tape. The impregnating liquid is cured in an oven 10 as shown schematically in Fig. 3, the temperature and length of cure depending upon the liquid used and the volume of the space to be filled by the impregnant.

After curing, the tape may be stripped from the device 11 which is now completely impregnated with a thermosetting resin and presents a hard exterior 12 of the same material.

The tape of the present invention may also be used as a so-called sacrifice tape. In such use it may be employed to cover metal encased electrical devices which are to be impregnated. In such use the entire case or can is covered with tape including the hole 13 for entry of the impregnating fluid. The unit is then impregnated, cured and the tape removed to present a clean insulated device 14 ready for use.

What I claim as new and desire to secure by Letters Patent of the United States is:

The method of producing an insulated electrical coil free of voids which comprises wrapping the coil with a fibrous tape composed in part at least of cellulose acetate fibers coated with polyisobutylene adhesive, immersing the wrapped coil in a bath of liquid solventless thermosetting resinous material, applying sufficient pressure to completely impregnate and coat the coil, releasing the pressure, draining any excess impregnant from the coil and curing the impregnated and coated coil for a time and at a temperature sufficient to complete the curing of the impregnating and coating material.

ALMY DARLENY COGGESHALL.

REFERENCES CITED

The following references are of record in the file of this patent:

UNITED STATES PATENTS

| Number | Name | Date |
| --- | --- | --- |
| 1,818,976 | Goff | Aug. 18, 1931 |
| 1,848,344 | Goff | Mar. 8, 1932 |

FOREIGN PATENTS

| Number | Country | Date |
| --- | --- | --- |
| 515,891 | Great Britain | Dec. 18, 1939 |